(12) United States Patent
Uhrig

(10) Patent No.: US 8,752,614 B2
(45) Date of Patent: Jun. 17, 2014

(54) HEAT EXCHANGER FOR UTILISING THE HEAT FROM WASTE WATER

(75) Inventor: Thomas Uhrig, Geisingen (DE)

(73) Assignee: Uhrig Kanaltechnik GmbH (DE)

( * ) Notice: Subject to any disclaimer, the term of this patent is extended or adjusted under 35 U.S.C. 154(b) by 1016 days.

(21) Appl. No.: 12/090,051

(22) PCT Filed: Oct. 11, 2006

(86) PCT No.: PCT/EP2006/009832
§ 371 (c)(1),
(2), (4) Date: Aug. 8, 2008

(87) PCT Pub. No.: WO2007/042283
PCT Pub. Date: Apr. 19, 2007

(65) Prior Publication Data
US 2009/0218071 A1    Sep. 3, 2009

(30) Foreign Application Priority Data

Oct. 11, 2005  (DE) .......................... 10 2005 048 689

(51) Int. Cl.
*F24H 3/00* (2006.01)

(52) U.S. Cl.
USPC .................. 165/47; 165/45; 138/38; 138/108

(58) Field of Classification Search
USPC .......... 165/47, 53, 45, 169, 170; 138/38, 108; 405/184.1, 150.1
IPC ...................................................... E03F 03/02
See application file for complete search history.

(56) References Cited

U.S. PATENT DOCUMENTS

| 4,256,170 | A | * | 3/1981 | Crump .......................... 165/154 |
| 5,351,720 | A | * | 10/1994 | Maimets .......................... 138/98 |
| 5,480,260 | A | * | 1/1996 | Shattuck et al. ................ 405/36 |
| 7,021,338 | B2 | * | 4/2006 | Berry, Jr. ....................... 138/108 |

FOREIGN PATENT DOCUMENTS

| DE | 3521585 | | 12/1986 |
| DE | 3521585 | A * | 12/1986 |
| DE | 19719311 | A1 * | 12/1997 |
| DE | 19719311 | A1 | 12/1997 |
| DE | 19719311 | | 12/1999 |
| DE | 20 2004 005 768 | | 10/2004 |
| DE | 20 2004 018 084 | | 2/2005 |
| DE | 202004018084 | U1 | 2/2005 |
| DE | 202004018084 | U1 * | 3/2005 |
| JP | 2002348942 | A * | 12/2002 |

* cited by examiner

*Primary Examiner* — Marc Norman
*Assistant Examiner* — Devon Russell
(74) *Attorney, Agent, or Firm* — Gerald E. Hespos; Michael J. Porco; Matthew T. Hespos

(57) ABSTRACT

Heat exchanger element for installation in sewage pipelines, the top side of which heat exchanger element has a heat-conducting exchange surface with heat exchanger chambers arranged on it, the heat exchanger element has in cross section a run-in gutter and run-off surfaces contiguous to the latter on both sides, and, in the region of the run-in gutter and the run-off surfaces, lines for the forward run, return run and distribution of a heat exchanger medium are arranged, the floor point of the run-in gutter, the lower region of the lines and/or the free margins of the run-off surfaces being designed as bearings for arranging the heat exchanger element in the sewage pipeline.

10 Claims, 4 Drawing Sheets

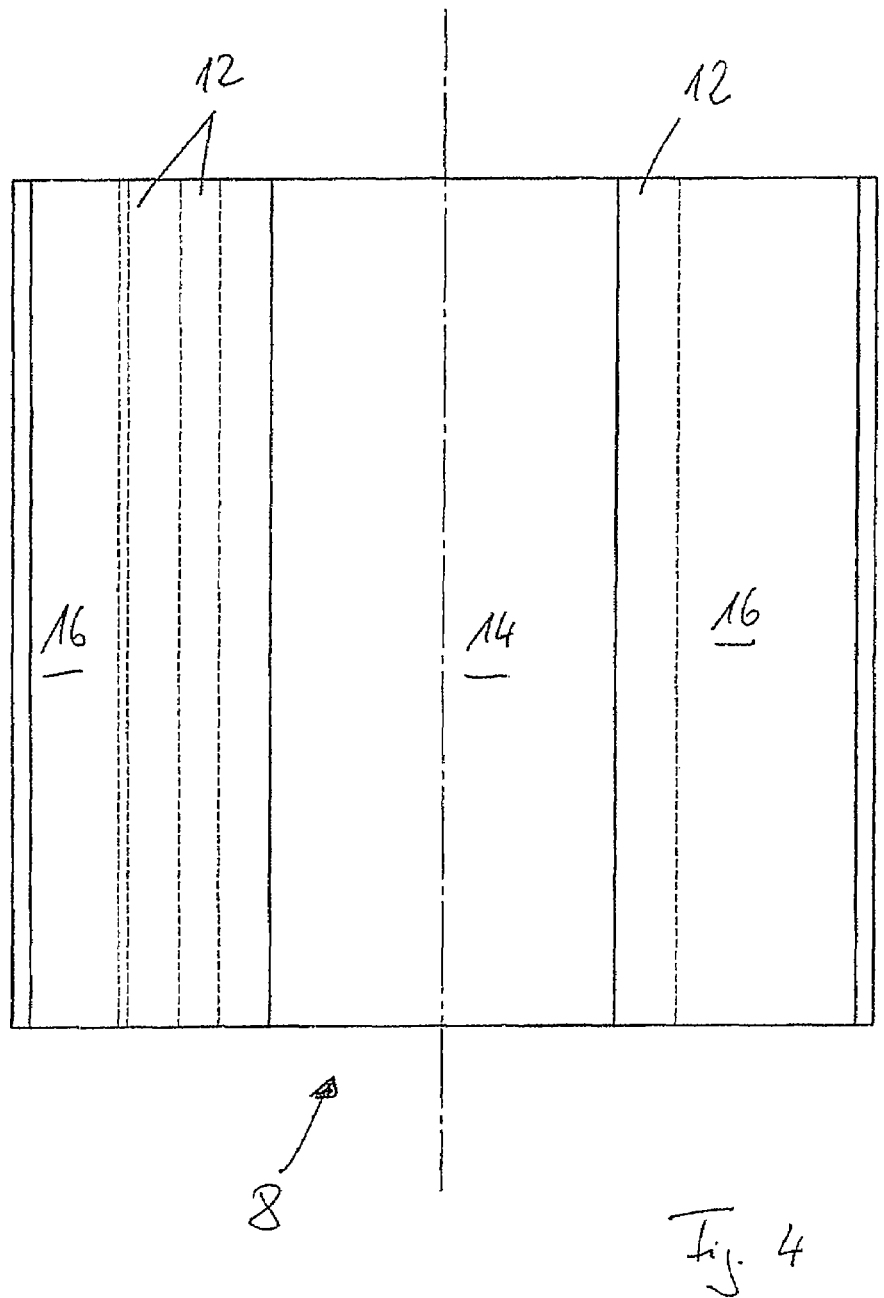

HEAT EXCHANGER FOR UTILISING THE HEAT FROM WASTE WATER

The invention relates to heat exchanger elements for, in particular, subsequent installation in sewage pipelines, to a pipeline system for sewage pipelines with heat exchanger elements and to a method for introducing a heat exchanger element into a pipeline system for sewage pipelines.

Energy recovery from sewage has been known for some time. For example, sewage pipelines are used, which are equipped, even at the production stage, with heat exchangers and with forward and return runs for the heat exchangers. Such a system is known, for example, from DE 35 21 585 A1. DE 197 19 311 A1, too, shows such a sewage pipeline.

However, since most pipeline systems for sewage are not equipped with heat exchangers, the two possibilities to be considered are simply a complete re-laying of sewage pipes already provided with heat exchangers or a subsequent equipping of the sewage pipelines with heat exchangers. Where subsequent equipping is concerned, heat exchanger elements are known which are introduced at the freely accessible pipeline start or end and, after being introduced, are concreted in for a firm mounting. For this purpose, however, it is necessary for the corresponding pipeline cross section to be exposed via a foundation ditch, in order to allow subsequent installation.

A further disadvantage in the retrofitting of sewage pipelines with heat exchangers is that, because of the increase in cross section, these result, in the sewage pipeline, in a build-up which is unacceptable. In order to avoid this, there is the possibility of installing the forward-run, return-run and distributor lines of the heat exchange system in the crown of the sewage pipeline, so that a build-up of sewage can be avoided due to the possibility of the very thin-walled design of the heat exchanger element. This has the disadvantage, however, that the lines located in the crown region of the sewage pipe obstruct the outflow, since, when there is a correspondingly high sewage level, articles of hygiene, toilet paper and other materials catch on the pipelines.

The object of the present invention is to propose a heat exchanger element for the recovery of energy from sewage, which can subsequently be mounted in existing sewage pipelines, without in this case obstructing the open-channel outflow of the sewage. In addition, a corresponding pipeline system for sewage pipelines is also to be proposed.

The object is achieved, in terms of the heat exchanger element, according to claim 1 and, in terms of the pipeline system, according to claim 10.

A basic idea of the heat exchanger element according to the invention for, in particular, subsequent installation in sewage pipelines is to design its cross-sectional height such that a build-up of the sewage flowing out in the open channel can be prevented and, at the same time, to avoid an arrangement of the lines for the forward run, return run and distribution of the heat exchanger medium in the sewage pipeline cross section and therefore outside the heat exchanger element. For this purpose, the heat exchanger element has a top side serving as a heat-conducting exchange surface and having heat exchanger chambers arranged on it. As seen in cross section, the top side of the heat exchanger element forms a preferably centrally arranged run-in gutter with run-off surfaces which are contiguous to the run-in gutter on both sides and which preferably descend obliquely towards the run-in gutter. The top side of the heat exchanger element is expediently designed symmetrically, as seen in cross section. The run-off surfaces arranged on both sides of the run-in gutter are also designated as berms. The region formed below the top side between the run-in gutter and the run-off surfaces makes sufficient free space available to arrange the lines or supply lines of the heat exchanger system for the forward run, return run and distribution of the heat exchanger medium. For securing in position, the corresponding lines are in this case connected correspondingly to the top side of the heat exchanger element. In a known way, heat exchanger chambers are provided on the top side, serving as an exchange surface, of the heat exchanger element and are arranged below the top side of the heat exchanger element serving as a heat exchanger surface. It would be appreciated in this case that, in a known way, the heat exchanger chambers are connected to the forward-run, return-run and distributor lines, so that the heat exchanger medium can flow through the abovementioned chambers or lines. In order to prevent a build-up of the sewage due to the presence of the heat exchanger element in the sewage pipeline, the floor of the run-in gutter, that is to say the lowest point of the run-in gutter, is designed such that it serves as a bearing for arranging the heat exchanger element in the sewage pipeline and therefore forms virtually no step in the lowest region of the sewage pipeline. So that the heat exchanger element can be arranged in the sewage pipe securely in position and without additional fastening measures, the lower regions of the forward-run, return-run and distributor lines and/or the free margins of the run-off surfaces are likewise designed as bearings for arranging the heat exchanger element. According to the configuration of the sewage pipeline, therefore, for example, a three-point mounting of the heat exchanger element can be achieved via the free marginal regions of the run-off surfaces or berms and of the floor point of the run-in gutter.

Advantageously, the heat exchanger element has in its end regions connecting configurations for the pressure-tight and tension-resistant connection of one or more further heat exchanger elements. The pressure-tightness is in this case designed such that the pressure prevailing in the lines for the forward run, return run and distribution of the heat exchanger medium cannot loosen the connection between individual heat exchanger elements. Tension resistance between the heat exchanger elements is therefore advantageously to be provided in order to ensure that, in the event of repair or of exchange, there is the possibility of being able to draw individual interconnected heat exchanger elements in the sewage pipe, for example in the direction of a conduit manhole, without these coming loose from one another. Pressure-tightness and tension resistance may in this case be achieved via known measures, such as seals, special snap connections, etc.

Expediently, the heat exchanger chambers are formed at least in the region of the run-in gutter. Advantageously, however, the heat exchanger chambers may be provided, as seen in cross section, below the entire top side of the heat exchanger element, that is to say also, in particular, in the region of the run-off surfaces contiguous to the run-in gutter. The efficiency of the heat exchanger element rises due to a maximum arrangement of heat exchanger chambers when, at the same time, it can be ensured that sewage not only flows out in the region of the run-in gutter, but also in the region of the run-off surfaces or berms.

Preferably, the longitudinal or transverse extent of the heat exchanger element may be selected such that the latter can be introduced through an overground conduit manhole of the respective sewage pipeline. According to the clear width of conduit manholes, in this case, preferably the longitudinal or transverse extent of 80 cm and, particularly preferably, 62.5 cm should not be overshot. Since the dimensions of the heat exchanger element are designed correspondingly, there is a possibility of introducing the individual heat exchanger elements into sewage pipelines subsequently, without in this case access to the pipelines having to be provided via a foundation ditch, since the individual heat exchanger elements can be introduced into the sewage pipe through the numerous conduit manholes present. It is therefore easily possible to introduce the heat exchanger elements through the conduit manhole, in order thereafter to lay them in the pipeline. It would in this case be appreciated that, to achieve a required efficiency, a plurality of individual heat exchanger elements are introduced into the sewage pipeline and connected to one another.

Expediently, the run-in gutter is designed in the form of an arcuate portion. In this case, for example, configurations of the run-in gutter which are in the form of an arc of a circle or are oval or elliptic may be envisaged; furthermore, the run-in gutter may have an egg-shaped cross section or kite-shaped cross section or be designed as a mouth profile. Which configuration is ultimately selected also depends on the incidence of sewage and on the cross-sectional configuration of the sewage pipe. On account of the heat exchanger element and its cross-sectional configuration with a run-in gutter and preferably with run-off surfaces contiguous to the latter, the sweeping force of the corresponding portion of the sewage pipe can advantageously be increased.

In this connection, it is expedient to produce the top side of the heat exchanger element from corrosion-resistant material which does not reduce flow velocities, for example high-grade steel. A suitable choice of material in this case not only influences the flow velocity, but, in particular, also the sweeping force, so as, in addition to an advantageous cross-sectional configuration of the heat exchanger element, to influence positively a fault-free outflow of the sewage in the open channel.

Advantageously, the heat exchanger chambers are formed by means of at least one profile part arranged below the top side of the heat exchanger element. The laying of the profile part against the top side in this case forms the configuration of the individual heat exchanger chambers. In the longitudinal direction of the heat exchanger element, such a profile part may cause a web-like separation of individual chambers in specific regions. The web-like lie does not necessarily in this case have to take place in the longitudinal direction, that is to say in the outflow direction of the sewage, but may also be formed obliquely or transversely to this, in order to obtain an advantageous flow of the heat exchanger medium within the heat exchanger chambers in order to increase the efficiency. In the configuration of the heat exchanger chambers and also in the designs of the lines for the forward run, return run and distribution of the heat exchanger medium, the known Tichelmann system may in this case advantageously be adopted, in order to optimize the efficiency of the heat exchanger elements. Thus, by means of the profile part, the heat exchanger elements can be designed in a cost-effective way, and they extend preferably over the entire region of the top side of the heat exchanger chambers, in order to utilize the entire surface of the top side of the heat exchanger element for heat exchange. It would in this case be appreciated that the material of the top side of the heat exchanger element is selected such that an optimized heat exchange between the sewage and the heat exchanger medium can take place, this also being influenced positively by as thin-walled a design of the top side of the heat exchanger element as possible.

Expediently, a heat exchanger element may also be designed as an end element or initial element and for this purpose may have at one of its free ends a ramp-like region of wedge-shaped design which extends into the floor region of the run-in gutter. It is not the lowest point of the run-in gutter which is an obstacle to outflow in the sewage pipe conduit, but, instead, the regions which are contiguous to the floor point or lowest point of the run-in gutter, in particular the region of the run-off surfaces which are arranged on both sides of the run-in gutter. In order to prevent a build-up of sewage in these regions, the ramp-like design is proposed. It may be implemented such that the free end regions of the ramp-shaped or wedge-shaped regions are designed such that, when arranged in the sewage pipe, they form an additional bearing region and therefore do not form any step in the sewage pipe over the entire initial region of a heat exchanger element. Depending on requirements, the ramp-like design may be shorter or longer, in order to make the gradient correspondingly lower or higher.

The top side of the heat exchanger element is advantageously provided with a profiling which reduces the formation of a biofilm or of a sewer slime caused by outflowing water. As is known, in time, sewage forms on the run-off surface a biofilm or a sewer slime which, in the case of sewage running off via a heat exchanger element, lowers the efficiency of the latter undesirably. A profiled run-off surface in this case ensures flow conditions which greatly reduce the formation of such a biofilm and, in the most favourable design, may under certain circumstances prevent it completely. What may be envisaged in this case as profiling are, for example, elevations of the most diverse possible geometric structure, such as, for example, parallelipeds, pyramids or even a gutter-shaped or spiral configuration. A brushing or a rubbing structure may also be envisaged as surface profiling.

The pipeline system according to the invention for sewage pipelines consists, first, of individual pipelines connected to one another in the usual way and of at least one overground conduit manhole of a specific clear diameter and also of heat exchanger elements which are introduced into the pipeline system or the pipelines subsequently and which form a dry water gutter for conducting the water and are capable of utilizing the heat of the sewage for energy recovery, the longitudinal or transverse extent of the individual heat exchanger elements being designed such that at least one extent is slightly smaller than the clear diameter of the conduit manhole, so that the individual heat exchanger elements could be introduced, above ground, into the pipeline through the conduit manhole.

Preferably, in a pipeline system, a plurality of sections consisting of interconnected heat exchanger elements are provided, since the sewage can be efficiently utilized in terms of temperature over a specific section only. Regions of the sewage pipe which are not provided with heat exchangers and in which it is possible for new sewage to accumulate, which only thereafter is supplied again to a new section of heat exchanger elements for energy recovery, should therefore be left free.

Advantageously, in the proposed pipeline system, the buoyancy of the heat exchanger elements introduced into the sewage pipeline, in particular even in the empty state of the heat exchanger chambers, present in the heat exchanger element, and lines for the forward run, return run and distribution of the heat exchanger medium, is, in the case of the full filling of the sewage pipeline, lower than the weight force of the heat exchanger elements introduced into the sewage pipeline. The interconnected heat exchanger elements are therefore of a weight such that buoyancy in the case of the full filling of the sewage conduit and in the case of empty heat exchanger lines or chambers is not possible. In this case, preferably, the individual heat exchanger elements are connected to one another such that, as far as possible, no sewage can penetrate below the individual heat exchanger elements.

Advantageously, in the pipeline system, at least one scouring or surge slide for the temporary interruption of the sewage outflow is arranged in the region of the introduced heat exchanger elements, as seen in the flow direction of the sewage. Preferably, the slide may in this case be arranged in the region of a conduit manhole, because there is more free space there for installation. Such a slide has various advantages. Inter alia, even after a short time, said sewer slime, which greatly lowers the efficiency of the heat exchangers, is formed in sewage conduits and therefore also on the top side of the heat exchanger elements. In order to avoid, but at least reduce, the formation of such a sewer slime, a surge or scouring slide is installed, which is preferably located in the end region of the section of laid heat exchanger elements, as seen in the flow direction of the sewage. Such a surge or scouring slide can build up the sewage at short intervals, in order thereafter to cause it to flow in a surge over and beyond the surfaces of the heat exchanger elements. Under these then resulting turbulent conditions in the outflow of the sewage, the formation of a sewer slime can be reduced. Such a surge or scouring slide also has a further advantage, in that an equalization of the sewage quantity conveyed over and beyond the heat exchangers can be brought about. As is known, the dry weather outflow quantity over the whole day is not constant, and therefore a compensation of the outflow quantity, as seen over the whole day, can be brought about by the installation of such a slide. Thus, for example, because the incidence of a dry weather outflow quantity is low at night, in the case of a higher incidence, for example in the early evening, the sewage can be built up by means of the respective slide and be supplied continuously to the heat exchangers over night as the incidence of sewage decreases. Of course, such a slide, because of the surge generated, also gives rise to a cleaning effect due to the discharge of heavier objects which may settle on the heat exchanger element.

In this pipeline system, the heat exchanger element is designed as was described above.

A method for introducing a heat exchanger element into a pipeline system or a pipeline of a sewage system preferably has the following steps:

introduction of the individual heat exchanger elements through an overground conduit manhole laying of a first heat exchanger element in the lower region of the pipeline on the inner surface of the latter arrangement of a device for the displacement of one or more heat exchanger elements attachment of the device for displacement to the heat exchanger element and subsequent displacement of the heat exchanger element.

The device for displacing the heat exchanger elements is in this case preferably braced in the sewage pipeline or in the region of the conduit manhole, so that it is possible to absorb the forces which are required to push the heat exchanger elements forwards in the direction of the sewage pipeline axis. For this purpose, the device may have, for example, hydraulic cylinders and be fastened to the heat exchanger element via a suitable configuration such that a reliable forward push and a drawback of the heat exchanger elements, which is required, if appropriate, in the event of repair or exchange, are possible. It will in this case be appreciated that the corresponding device is configured such that it can likewise be introduced into the pipeline through the conduit manhole. This has the particular advantage that even impassable pipelines can be equipped with heat exchanger elements subsequently, since the displacement work is carried out in the region of the conduit manhole. In the event that the sewage pipelines to be equipped subsequently with heat exchanger elements already have a raceway which is not formed in one piece with the pipeline, but has itself been produced subsequently, for example in the form of clinker bricks, the raceway may be removed beforehand, but at least be stripped off such that a subsequent installation of heat exchanger elements becomes possible.

In order to make a sufficient area available for heat exchange, a plurality of heat exchanger elements are arranged one behind the other until a sufficient length is available. In this case, the following further method steps are employed:

introduction of one or more further heat exchanger elements and laying of these in the lower region of the pipeline on the inner surface of the latter release of the device for displacement from the first heat exchanger element connection of the further heat exchanger element to the first heat exchanger element, if appropriate with the addition of sealing elements in the connection region between the heat exchanger elements subsequent attachment of the device for displacement to the further heat exchanger element, and joint displacement of the first and of the further heat exchanger element or heat exchanger elements in the pipe longitudinal direction.

The further method steps in this case have the advantage that, as a result of the displacement of the further heat exchanger elements, the corresponding connection region on the already laid heat exchanger element can be closed sufficiently to provide a pressure-tight and also tension-resistant connection between the individual heat exchanger elements. The pressure-tight connection is necessary, so that the internal pressure prevailing in the forward-run and return-run lines does not push the individual heat exchanger elements apart from one another. Tension resistance is required, so that, in the event of exchange, the interconnected heat exchanger elements can be jointly drawn back again in the direction of the conduit manhole.

In summary, on account of the proposed heat exchanger element, of the corresponding pipeline system and of the method described, it is possible to introduce heat exchanger elements subsequently into already laid sewage pipelines, without it being necessary in this case to expose the sewage pipes via a foundation ditch, so that heat exchanger elements can be introduced at all, as has hitherto been the case. A further advantage is that the heat exchanger elements are designed such that their components form bearings on the corresponding sewage pipeline gutter wall, while it is easily possible also to take into account other cross sections in addition to circular sewage pipeline cross sections. Moreover, there is no need for the individual heat exchanger elements to have to be fastened, for example concreted in, separately on the pipe inner wall, since the bearing weight, together with the bearing points present, is fully sufficient to ensure a secure arrangement of the heat exchanger elements. The use of the proposed heat exchanger elements is appropriate particularly in town centre areas where digging-up to reach the sewage pipeline is usually not possible. However, precisely in town centre areas, there are sufficient conduit manholes which make it possible to introduce the heat exchanger elements and also the device for displacing the heat exchanger elements into the pipeline.

The basic idea of the heat exchanger element according to the invention for the subsequent installation in sewage pipelines is therefore to configure the geometry of the heat exchanger wetted with sewage, that is to say its surface, such that no obstacle to outflow is caused by the subsequent installation of the heat exchanger elements the forward-run and return-run lines and the heat exchanger chambers of the heat exchanger elements are integrated in the flow cross section of the heat exchanger and therefore likewise do not form any obstacle to outflow in the sewage conduit or the pipeline the heat exchanger elements, when introduced into the pipeline, do not have to be concreted in or additionally fastened in another way in terms of their final position, thus, on the one hand, avoiding the need for additional work steps and, on the other hand, making a subsequent repair of, for example, defective connections or individual heat exchanger elements possible at any time, and the installation of the individual heat exchanger elements can take place, without additional digging-up or exposure of the sewage pipeline, from any of the numerous conduit manholes usually present.

The invention is described in more detail by way of example with reference to the following figures in which:

FIG. 4 shows a top view of a heat exchanger element.

Figure 1:
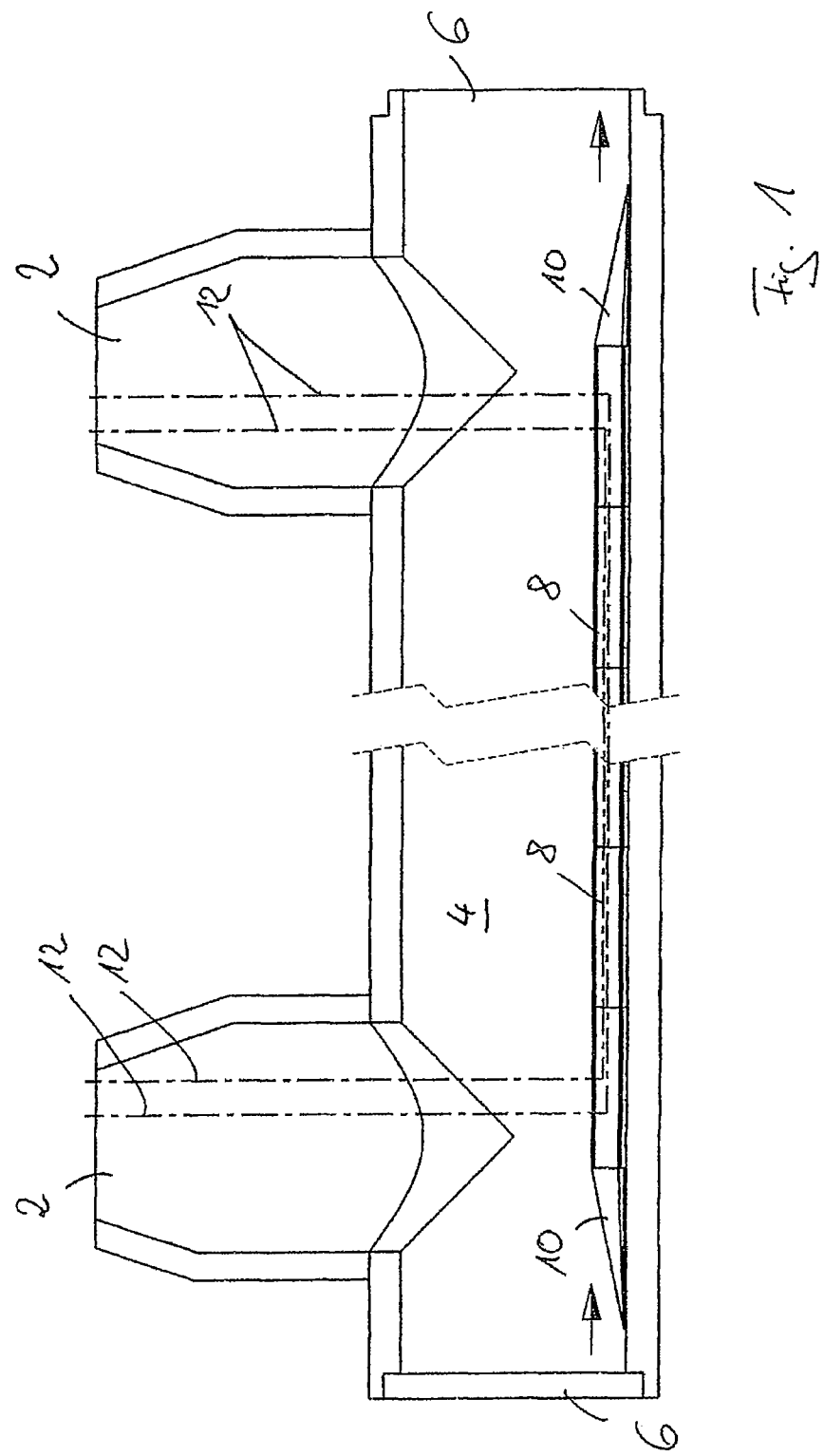
FIG. 1 shows a longitudinal section through a sewage pipeline system with two conduit manholes.

The sewage pipeline system shown in longitudinal section in FIG. 1 has two conduit manholes 2 which are illustrated near to one another in the drawing because a region between the conduit manholes 2 is not shown in FIG. 1.

Contiguous to and below the conduit manholes 2 is a sewage pipeline 4, of which the end regions 6 provided with sockets are illustrated, adjacent to the conduit manholes 2, further sewage pipelines, not shown, being contiguous to the sewage pipeline 4. The sewage pipeline system shown may be, for example, a sewage conduit which is arranged in a town centre area. At the lower point of the sewage pipeline 4, that is to say where the sewage first accumulates, individual heat exchanger elements 8 are illustrated, which end in the region of the conduit manholes 2 in heat exchanger elements 10 designed as end pieces or initial pieces. These heat exchanger elements 10 designed as end pieces or initial pieces have in their free end regions wedge-shaped slopes, in order to prevent a build-up of sewage upstream of the heat exchanger elements 8 subsequently introduced into the sewage pipeline 4. The length of the wedge-shaped portion, which terminates with its free end on the inner surface of the sewage pipeline 4, may be designed variably in length according to the requirements, in order to form steeper or flatter gradients.

Illustrated by dashes are forward-run, return-run and distributor lines 12 which are arranged on the heat exchanger elements 8 and 10 and emerge from the respective heat exchanger elements 8 in the region of the conduit manholes 2 in order to be led upwards to the overground termination of the conduit manholes 2, so that they can be connected to an external heat exchanger system, not illustrated, which is usually arranged above ground. Likewise illustrated by dashes are the runs of the lines 12 within the individual heat exchanger elements 8. The desired efficiency of the heat exchanger system and the sewage quantity occurring and its temperature and also the corresponding pipe cross section and therefore also the dimensions of the heat exchanger elements 8 ultimately determine the overall number of heat exchanger elements 8 arranged one behind the other.

In order to introduce the heat exchanger elements 8 into the pipeline, without in this case having to expose the free ends of the sewage pipeline by means of foundation ditches, the dimensions of the heat exchanger elements 8 are designed so that the heat exchanger elements 8 can be introduced, above ground, into the sewage pipeline 4 through the conduit manhole 2.

Figure 2:
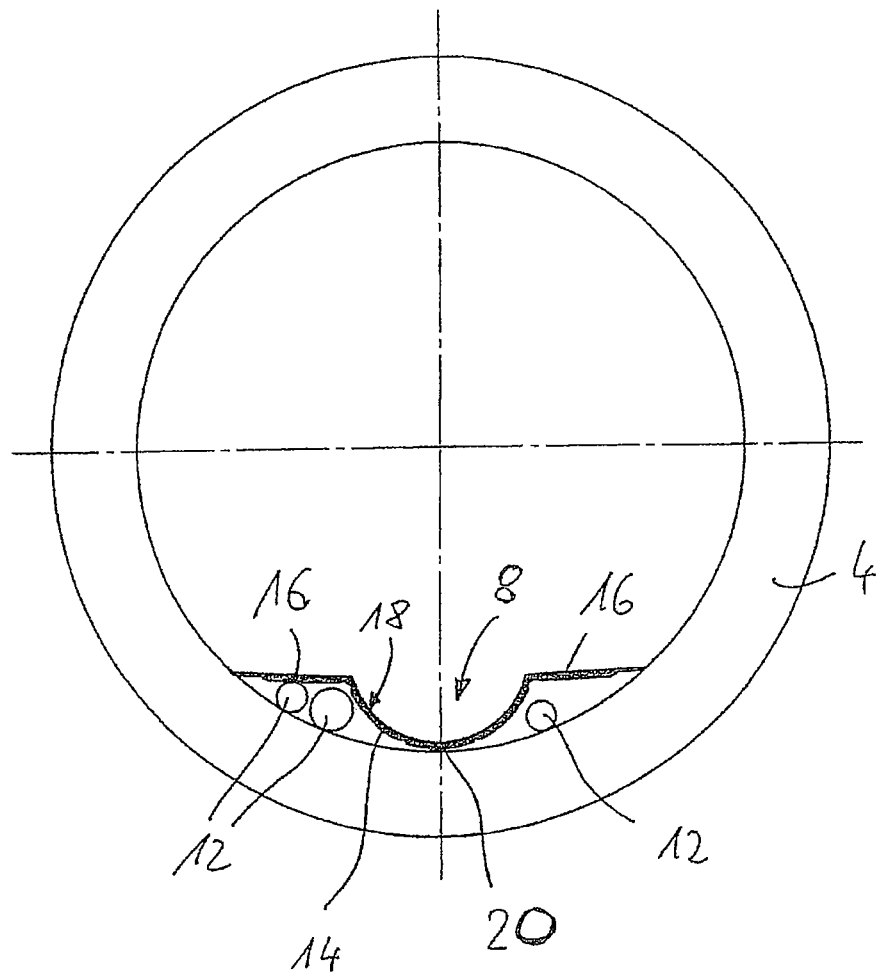
FIG. 2 shows a cross section through a sewage pipeline with a heat exchanger subsequently arranged in the lower region.

FIG. 2 shows in cross section a sewage pipeline 4 which has a circular inside diameter. In the lower region of the pipeline 4, a heat exchanger element 8 is shown which has a run-in gutter 14 in the form of a trough with a cross section which here is, for example, in the form of an arc of a circle. Planar run-off surfaces 16 are contiguous to the run-in gutter 14 on both sides, preferably with a specific gradient towards the run-in gutter 14, and end at the sewage pipe inner wall and preferably lie there. In this case, the run-in gutter 14 and the planar run-off surfaces 16 contiguous to the latter constitute the top side 18 of the heat exchanger element 8.

It is in this case advantageous if not only the run-in gutter 14, but also the run-off surfaces 16, which are also designated as berms, are likewise wetted by the sewage, so that heat exchange can take place not only in the region of the run-in gutter 14, but also in the adjacent region and therefore in the region of the overall surface of the heat exchanger element 8. For this purpose, the run-in gutter 14 may be designed such that the sewage likewise also flows over the run-off surface 16 present on the right and left next to the run-in gutter 14, in order to achieve a full utilization of the top side 18, serving as a heat exchanger surface, of the heat exchanger elements 8 and 10.

The lines, arranged on the heat exchanger element 8, for the forward run, return run and distribution of the heat exchanger medium are shown in the region between the run-in gutter 14 and the run-off surfaces 16. The lines 12 may serve as bearings or bearing points of the heat exchanger element 8 on the inner wall of the sewage pipeline 4, specifically with the region with which the said lines are in contact with or lie against the inner wall of the sewage pipeline 4. The floor point 20, that is to say the lowest point, of the run-in gutter and also the free end regions of the run-off surface 16, as seen in cross section, likewise serve as bearings or bearing points of the heat exchanger element 8, specifically where they are in each case in contact with or lie on the inner wall of the sewage pipeline 4. It would in this case be appreciated that the cross-sectional form of the heat exchanger element 8, including the position of the lines 12, is designed such that they can be adapted to the respective cross section of the sewage pipeline 4 in question. Since a plurality of bearings or bearing points are thus available, there is corresponding flexibility. As a rule, the floor point 20 of each heat exchanger element 8 will always serve as a bearing, particularly with regard to the heat exchanger elements 10 designed as end pieces or initial pieces, because this makes it possible to ensure that a step in the sewage pipeline 4 on account of the arrangement of the heat exchanger elements 8 and 10 can be prevented.

Figure 3:
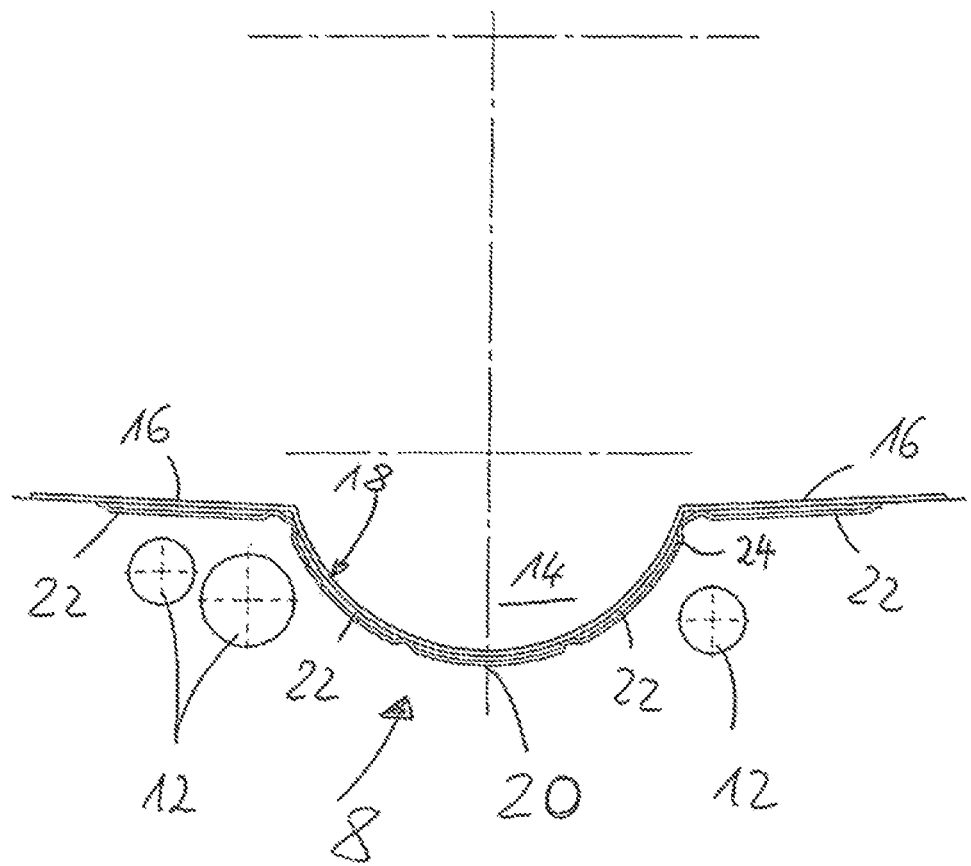
FIG. 3 shows a cross section through a heat exchanger element.

FIG. 3 shows the heat exchanger element 8 in cross section, in which depiction the heat exchanger chambers 22 can be seen, which are arranged on the top side 18 of the heat exchanger elements 8 and preferably extend over the entire top side 18. The chambers 22 are formed by a preferably thin-walled profile part 24 which is arranged below the top side 18 of the heat exchanger element 8. Consequently, the chambers are formed by the top side 18 of the heat exchanger element 8 and the profile part 24 lying beneath it. In order to form a plurality of chambers 22, the profile part 24 bears directly at various locations against the top side 18 of the heat exchanger element 8, so that individual chambers 22 are formed between the bearing points or bearing sections. In order to achieve an optimized heat exchange, the chambers 22 are not only arranged over the entire region of the top side 18 of the heat exchanger element 8, but, moreover, are also of relatively narrow design, as seen in cross section. The heat exchanger medium, as a rule water, enriched with additives against corrosion, which is heated by sewage running off on the top side 18, circulates in the chambers 22. The chambers 22 are in this case connected to the lines 12 in order to provide a heat exchanger system, relatively cool heat exchanger medium being introduced at one location into the forward-run line 12 which then, after running through the chambers 22 and being heated by the sewage, is discharged through the return-run line 12.

In order to achieve optimized heat exchange between the sewage and the medium located in the chambers 22, the top side 18 of the heat exchanger elements 8 and 10 is of as thin-walled a design as possible.

In the free end region of the heat exchanger elements 8, that is to say at their front or rear termination, an additional supporting element, not shown, may also be mounted, which extends downwards in the direction of the lines 12 perpendicularly with respect to the run-in raceway 14 or the run-off surfaces 16. It will in this case be appreciated that the lower free end margin of this supporting element does not extend any further than as far as the floor point 20 or the lower edges of the lines 12, so that the mounting of the heat exchanger element 8 via the floor point 20, the lower regions of the lines 12 and/or the free end regions of the run-off surfaces 16 is not interrupted. The supporting element must in this case have recesses for the heat chambers 22, the run-in gutter 14 and the lines 12 and in the outer marginal regions preferably terminates flush with the free ends of the run-off surfaces 16. In the case of a circular inside diameter of the sewage pipeline, the supporting element would correspondingly have a profile of equal radius, in the form of an arc of a circle, between the connection regions of the run-off surfaces 16. Such a supporting element may, of course, also be formed additionally between the end regions of the heat exchanger elements. In the case, for example, of circular cross sections of sewage pipelines, such supporting elements arranged between the end regions would likewise take the form of components in the form of an arc of a circle.

FIG. 4, finally, shows a top view of a heat exchanger element 8 with the run-in gutter 14, here arranged centrally, and with the smooth or planar run-off surfaces 16 which are contiguous to the run-in gutter 14 and run obliquely towards the run-in gutter 14 and which, as required, allow sewage to run off towards the run-in gutter 14.

Not described in any more detail, the arrangement or run of the chambers 22, not illustrated in FIG. 4, with the lines 12 must give optimal energy recovery. In a known way, in this case, the Tichelmann principle is employed, which allows the highest possible heat exchange and therefore the highest possible energy recovery or efficiency.

LIST OF REFERENCE SYMBOLS

2 Conduit manhole
4 Sewage pipeline
6 End region
8 Heat exchanger element
10 Heat exchanger element in the form of an end piece or initial piece
12 Forward-run, return-run and distributor lines
14 Run-in gutter
16 Run-off surface or berm
18 Top side heat exchanger element
20 Floor point
22 Heat exchanger chamber
24 Profile part

The invention claimed is:

1. A heat exchanger element for installation in a sewage pipeline, the sewage pipeline having a longitudinal axis and a concave inner circumferential surface extending along the longitudinal axis, the heat exchanger element comprising:
   opposite upstream and downstream ends;
   parallel left and right side edges extending between the upstream and downstream ends;
   opposite upper and lower surfaces between the upstream and downstream ends and between the left and right side edges;
   heat exchanger chambers between the upper and lower surfaces;
   a run-in gutter extending from the upstream end to the downstream end and spaced inward from the left and right side edges, the upper surface of the run-in gutter being concave from the upstream end to the downstream end and the lower surface of the run-in gutter being convex from the upstream end to the downstream end;
   left and right run-off surfaces formed on the upper surface of the heat exchanger element between the left and right side edges and the run-in gutter;
   the heat exchanger element being configured relative to the sewage pipeline so that the left and right side edges are simultaneously engageable with spaced apart locations on the inner circumferential surface of the sewage pipeline while the lower surface of the run-in gutter defines a floor point engaging the inner circumferential surface of the sewage pipeline from the upstream end to the downstream end of the heat exchanger element; and
   areas of the lower surface between the floor point and the left and right side edges being spaced from the inner circumferential surface of the sewage pipeline for accommodating heat exchange lines.

2. The heat exchanger element of claim 1, the upstream and downstream ends are configured respectively for a pressure-tight and tension-resistant connection respectively to downstream and upstream ends of one or more further heat exchanger elements.

3. The heat exchanger element of claim 1, wherein the heat exchanger chambers are formed at least in the region of the run-in gutter.

4. The heat exchanger element of claim 1, wherein a longitudinal extent of the heat exchanger element from the upstream end to the downstream end or transverse extent of the heat exchanger element from the left edge to the right edge is selected such that the heat exchanger element can be introduced through an overground conduit manhole of the respective sewage pipeline and does not exceed a length of 80 cm.

5. The heat exchanger element of claim 1, wherein the upper and lower surfaces at the run-in gutter are arcuate.

6. The heat exchanger element of claim 1, wherein the upper surface comprises a corrosion-resistant material that does not reduce flow velocities.

7. The heat exchanger element of claim 1, further comprising an upper sheet defining the upper surface and a lower sheet defining the lower surface, the lower sheet being a profile part being configured to define the heat exchanger chambers between the upper and lower sheets.

8. The heat exchanger element of claim 1, further comprising at least one of an upstream ramp and a downstream ramp connected to at least one of the upstream and downstream ends of the heat exchanger element and having a wedge-shape tapering toward the inner circumferential surface of the sewage pipeline at farther distances from the heat exchanger element.

9. A sewage pipeline system, comprising:
a sewage pipeline that has a longitudinal axis and a concave inner circumferential surface extending along the longitudinal axis; and
a plurality of heat exchanger elements having opposite upstream and downstream ends, the heat exchanger elements being arranged in end to end relationship so that the upstream end of one of the heat exchanger elements is connected to a downstream end of another of the heat exchanger elements, each of the heat exchanger elements having parallel left and right side edges engaging the inner circumferential surface of the sewage pipeline and having opposite upper and lower surfaces, heat exchanger chambers being formed between the upper and lower surfaces, a run-in gutter extending from the upstream end to the downstream end of each of the heat exchanger elements and spaced inward from the left and right side edges, the upper surface of the run-in utter being concave, the lower surface of the run-in gutter being convex and being supported on the inner circumferential surface of the sewage pipeline along a line extending from the upstream end to the downstream end, left and right run-off surfaces formed on the upper surface of the heat exchanger element between the left and right side edges, areas adjacent the lower surface of the heat exchanger element and on opposite sides of the run-in gutter being spaced from the inner circumferential surface of the sewage pipeline for accommodating heat exchange lines.

10. The sewage pipeline system of claim 9, wherein a buoyancy of the heat exchanger elements introduced into the sewage pipeline is lower than a weight force of the heat exchanger elements in the case of a fully filled sewage pipeline.

* * * * *